March 14, 1961 G. WHITEHURST 2,974,681
ROTARY FLUID DISTRIBUTOR VALVES
Filed July 15, 1957
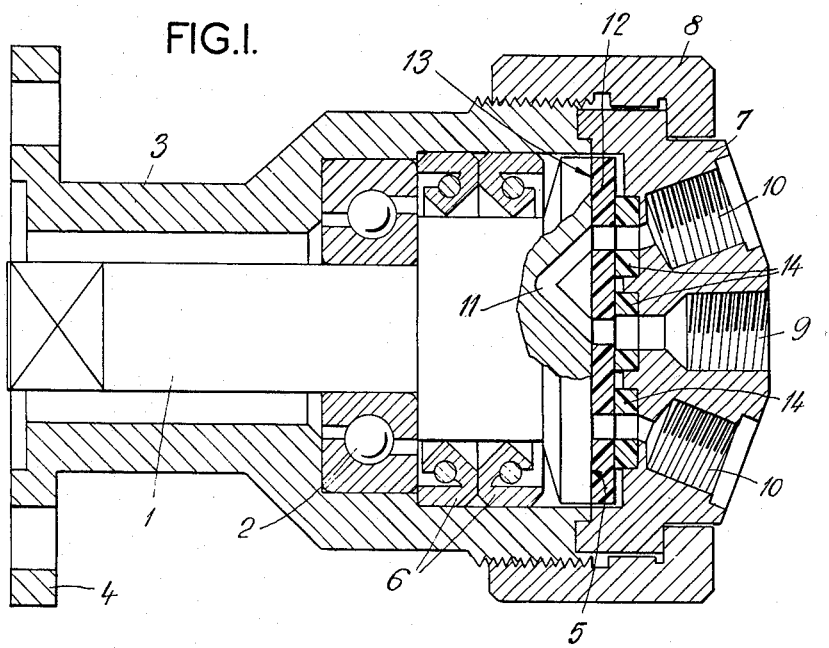
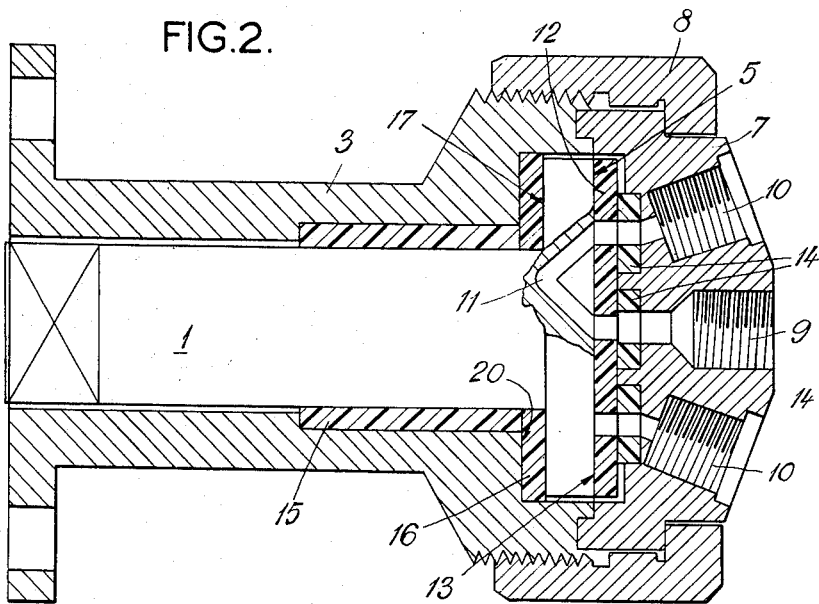
INVENTOR:
GEORGE WHITEHURST

United States Patent Office 2,974,681
Patented Mar. 14, 1961

2,974,681

ROTARY FLUID DISTRIBUTOR VALVES

George Whitehurst, 37 Merton Road, Harrow, England
Filed July 15, 1957, Ser. No. 671,823

Claims priority, application Great Britain July 18, 1956

1 Claim. (Cl. 137—624.13)

This invention relates to rotary, fluid distributor valves and aims at providing a valve capable of distributing highly volatile liquids at very high pressure and velocity, as for example in the distribution of petrol to multi-cylinder internal combustion engines.

According to the invention, one of the sealing surfaces is of metal and the other is of the synthetic resin material polytetrafluoroethylene. The sealing surfaces may be pressed together by suitable resilient means such as synthetic rubber or other convenient material which is resistant to attack by the fluid to be distributed.

More particularly the invention provides a rotary fluid distributor valve comprising a rotor having a flat sealing surface and rotatable within a housing about an axis normal to said sealing surface, a distributor head having inlet and outlet ports and secured or adapted to be secured to the housing and a thrust pad dry bearing material made by Glacier Metal Company Limited having a sealing surface pressed or adapted to be pressed against the sealing surface of the rotor by means of a resilient washer or washers interposed between said thrust pad and said distributor head, said rotor having a duct for connecting an inlet port of said thrust pad with an outlet port thereof.

Embodiments of the invention will now be described by way of example with reference to the accompanying drawings in which:

Fig. 1 is an axial section of one form of construction of rotary fluid distributor valve according to the invention for distributing petrol to multi-cylinder internal combustion engines, and Fig. 2 is a similar view of a modified form of construction of the valve shown in Fig. 1.

Referring to the drawings, a rotor 1 is mounted on an anti-friction combined journal and thrust bearing in the form of a ball bearing 2, within a housing 3 adapted to be bolted by flange 4 to the housing of a pump or any other suitable drive for supplying petrol to the engine. The rotor 1 includes a short driving shaft extending to one end of the housing and presents a flat sealing surface 5 at the other end of the housing. Oppositely facing oil seals 6 are provided for preventing leakage of oil from the bearings to the sealing face of the rotor and of petrol in the opposite direction.

A distributor head 7 is secured to the open end of the housing by means of a lock nut 8 and is provided with a central inlet port 9 for the petrol to be distributed and a plurality of outlet ports 10 arranged about the central inlet port. The rotor is provided with a communicating duct 11 for connecting the inlet port 9 in turn to each of the outlet ports 10 while sealing off the remaining ports. Located within the distributor head is a thrust pad 12 dry bearing material made by Glacier Metal Company Limited. This material consists of a steel backing onto which is sintered a porous bronze matrix impregnated with polytetrafluoroethylene. The thrust pad has a flat sealing surface 13 of the polytetrafluoroethylene which is pressed into sealing engagement with the sealing surface 5 of the rotor by means of washers 14 of petrol-resistant synthetic rubber interposed between the thrust pad and the distributor head. A convenient material has been found to be a substance known as Vulkallon. The thrust pad 12 and washers 14 are apertured to correspond to the ports in the distributor head.

The end thrust on the thrust pad and thrust washers can be adjusted as desired by the interposition of shims between the distributor head 7 and the housing 3.

It will be seen that the invention provides a rotary distributor valve, for distributing highly volatile liquids, which does not leak externally and which does not suffer from inter-port interference or over heating. The latter point is particularly important when dealing with petrol and other highly volatile inflammable liquids. No lubrication of the rotor face is necessary by reason of the non-metallic thrust pad. The resilient washers of synthetic rubber or like material perform the dual function of creating thrust on the thrust pad and of sealing the pad against leakage.

The distributor as hereinbefore described has been found to operate with satisfactory results up to pressures of 45 atmospheres.

Fig. 2 illustrates a modified construction in which the combined journal and thrust ball bearing 2 of the construction shown in Fig. 1 and is replaced by a journal bearing, in the form of a bush 15, and a thrust washer 16. The bush has a bearing surface of synthetic resin material, such as polytetrafluoroethylene and the washer 16 is also of similar material. Washer 16 also takes the place of the oil seals 6 in the construction shown in Fig. 1 and engages a shoulder face 17 machined on the rotor 1 at right angles to its axis. The thrust washer 16 abuts against a shoulder 20 and is a press fit in the housing and serves as bush bearing and petrol or oil seal.

I claim:

A rotary fluid distributor valve comprising a housing, a rotor rotatably disposed in said housing, a distributor head, means adjustably securing said distributor head to said housing, said distributor head having an inlet port therein and a plurality of outlet ports therein, a substantially non-metallic relatively rigid thrust pad fixedly secured within said housing between said rotor and said distributor head, recesses in said distributor head, resilient washers in said recesses, said washers extending beyond said distributor head and engaging said thrust pad, a duct in said rotor, and apertures in said thrust pad and said washers for alignment with said inlet port and said duct and for selective alignment with said outlet ports for successively communicating said inlet port with said outlet ports upon rotation of said rotor.

References Cited in the file of this patent

UNITED STATES PATENTS

| | | |
|---|---|---|
| 1,141,472 | McCormick | June 1, 1915 |
| 2,415,888 | Joy | Feb. 18, 1947 |
| 2,477,590 | Ferwerda | Aug. 2, 1949 |
| 2,631,811 | Malloy | Mar. 17, 1953 |
| 2,633,325 | Whitlock | Mar. 31, 1953 |
| 2,666,677 | Miller | Jan. 19, 1954 |
| 2,691,814 | Tait | Oct. 19, 1954 |
| 2,696,219 | Barksdale | Dec. 7, 1954 |
| 2,715,617 | White | Aug. 16, 1955 |
| 2,776,104 | Sinkler | Jan. 1, 1957 |

FOREIGN PATENTS

| | | |
|---|---|---|
| 482,844 | Italy | July 13, 1953 |